(12) United States Patent
Fukatani et al.

(10) Patent No.: US 10,647,895 B2
(45) Date of Patent: May 12, 2020

(54) INTERLAYER FILLER MATERIAL FOR TOUCH PANELS, AND TOUCH PANEL LAMINATE

(71) Applicant: SEKISUI CHEMICAL CO., LTD., Osaka (JP)

(72) Inventors: Juichi Fukatani, Osaka (JP); Kiyomi Uenomachi, Osaka (JP); Takazumi Okabayashi, Osaka (JP); Ryousuke Ebina, Osaka (JP); Atsushi Wada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/764,983

(22) PCT Filed: Oct. 6, 2016

(86) PCT No.: PCT/JP2016/079808
§ 371 (c)(1),
(2) Date: Mar. 30, 2018

(87) PCT Pub. No.: WO2017/061549
PCT Pub. Date: Apr. 13, 2017

(65) Prior Publication Data
US 2018/0282598 A1 Oct. 4, 2018

(30) Foreign Application Priority Data
Oct. 7, 2015 (JP) .................................. 2015-199740

(51) Int. Cl.
*C09J 133/14* (2006.01)
*C09J 129/14* (2006.01)
(Continued)

(52) U.S. Cl.
CPC ................ *C09J 129/14* (2013.01); *C08K 5/10* (2013.01); *C08K 5/52* (2013.01); *C09J 4/06* (2013.01);
(Continued)

(58) Field of Classification Search
None
See application file for complete search history.

(56) References Cited

U.S. PATENT DOCUMENTS

2016/0002505 A1* 1/2016 Mizutani .............. C08F 220/18
345/173
2018/0244831 A1* 8/2018 Hirata ..................... C09D 4/00

FOREIGN PATENT DOCUMENTS

| EP | 3 128 398 | 2/2017 |
| EP | 3 306 448 | 4/2018 |

(Continued)

OTHER PUBLICATIONS

Extended European Search Report dated Apr. 1, 2019 in corresponding European Application No. 16853701.7.
(Continued)

*Primary Examiner* — Amare Mengistu
*Assistant Examiner* — Shawna T Stepp Jones
(74) *Attorney, Agent, or Firm* — Wenderoth, Lind & Ponack, L.L.P.

(57) ABSTRACT

The present invention aims to provide an interlayer filling material for a touch panel which is used for filling an interlayer space between a touch panel and another component or an interlayer space between transparent conductive films included in the touch panel in production of a personal digital assistant, is less likely to cause cracks or breakage in a surface protection panel or a glass substrate, and enables production of a touch panel laminate that is not likely to display images with color irregularity. The present invention (Continued)

also aims to provide a touch panel laminate produced using the interlayer filling material for a touch panel. The present invention relates to an interlayer filling material for a touch panel used for filling an interlayer space between a touch panel and another component, or at least one of interlayer spaces included in the touch panel between transparent conductive films, between a glass sheet and one of the transparent conductive films, between a glass sheet and another glass sheet, between a glass sheet and a polarizing film, between a substrate and a glass sheet, between a substrate and one of the transparent conductive films, and between a substrate and a polarizing film, the interlayer filling material containing: a polyvinyl acetal; and a plasticizer, the interlayer filling material having a residual stress Kpa (25° C., 2 min) after two minutes at 25° C. of 300 kPa or less.

9 Claims, 1 Drawing Sheet

(51) Int. Cl.
  *C09J 4/06* (2006.01)
  *C09J 11/06* (2006.01)
  *G06F 3/041* (2006.01)
  *C09J 183/06* (2006.01)
  *C09J 163/00* (2006.01)
  *C08K 5/10* (2006.01)
  *C08K 5/52* (2006.01)

(52) U.S. Cl.
  CPC .............. *C09J 11/06* (2013.01); *C09J 163/00* (2013.01); *C09J 183/06* (2013.01); *G06F 3/041* (2013.01); *G06F 2203/04103* (2013.01)

(56) References Cited

FOREIGN PATENT DOCUMENTS

| | | | | |
|---|---|---|---|---|
| JP | 2005-289038 | | 10/2005 | |
| JP | 2011-74308 | | 4/2011 | |
| JP | 2014-191441 | | 10/2014 | |
| JP | 2015-151326 | | 8/2015 | |
| JP | 2015151326 | * | 8/2015 | ............. C03C 27/12 |
| TW | 201329193 | | 7/2013 | |
| WO | 2012/132115 | | 10/2012 | |

OTHER PUBLICATIONS

International Preliminary Report on Patentability dated Apr. 10, 2018 in International (PCT) Application No. PCT/JP2016/079808.
International Search Report dated Dec. 13, 2016 in International (PCT) Application No. PCT/JP2016/079808.
Office Action dated Nov. 4, 2019 in corresponding European Application No. 16853701.7.

* cited by examiner

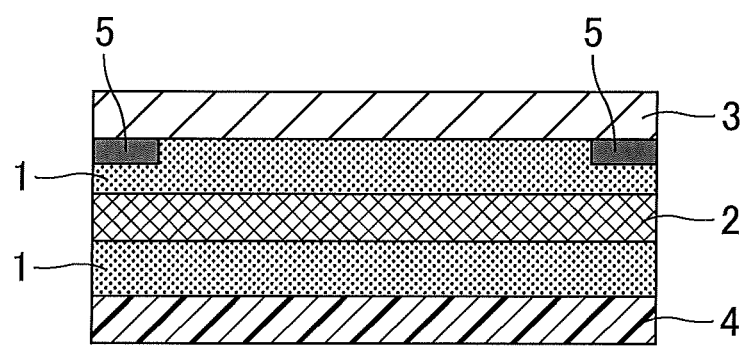

INTERLAYER FILLER MATERIAL FOR TOUCH PANELS, AND TOUCH PANEL LAMINATE

TECHNICAL FIELD

The present invention relates to an interlayer filling material for a touch panel which is used for filling an interlayer space between a touch panel and another component or an interlayer space between transparent conductive films included in the touch panel in production of a personal digital assistant, is less likely to cause cracks or breakage in a surface protection panel or a glass substrate, and enables production of a touch panel laminate that is not likely to display images with color irregularity. The present invention also relates to a touch panel laminate produced using the interlayer filling material for a touch panel.

BACKGROUND ART

Touch panels are used in various fields. In a personal digital assistant such as smartphones or tablet PCs, a touch panel is provided below a surface protection panel made of glass or the like. Below the touch panel, a polarizing film and a display are provided in the stated order.

In such a personal digital assistant, for the purpose of improving the transparency, luminance, and contrast on the display screen to enhance the visibility, an interlayer space between the surface protection panel and the touch panel and an interlayer space between the touch panel and the polarizing film are filled with a filling material that has a smaller difference in refractive index with these components than air does.

As interlayer filling materials for a touch panel, acrylic adhesives are often used from the standpoint of transparency, adhesiveness, and coating properties (see Patent Literature 1, for example).

A touch panel laminate produced using an acrylic adhesive as an interlayer filling material, however, tends to have cracks or breakage in a surface protection panel or a glass substrate. Along with the recent trend of downsizing, thinning, or weight reduction of a personal digital assistant, thinning of a surface protection panel, a glass substrate, or a filling material has been promoted. Such a thin touch panel laminate, however, is more likely to have cracks or breakage.

CITATION LIST

Patent Literature

Patent Literature 1: JP 2011-74308 A

SUMMARY OF INVENTION

Technical Problem

The present inventors intensively studied about the cause of cracks or breakage in a surface protection panel or a glass substrate upon application of impact on a touch panel. Surface protection panels and glass substrates used in touch panels essentially have very high strength and therefore are less likely to have cracks or breakage by dropping impact. As a result of intensive studies, the present inventors found out that a conventional interlayer filling material for a touch panel prepared from an acrylic adhesive is deformed on impact, due to its low toughness or flexural stiffness, to cause a flexure in a surface protection panel or a glass substrate, which results in cracks or breakage in the surface protection panel or the glass substrate. The present inventors also considered the use of an acrylic adhesive exhibiting a high modulus of elasticity owing to its high degree of crosslinking. An acrylic adhesive having an enhanced modulus of elasticity however has poor adhesion force to glass or suffers significant cure shrinkage.

To overcome the situation, the present inventors considered the use of a polyvinyl acetal, as an alternative to conventionally widely used acrylic adhesives, for an interlayer filling material for a touch panel. Polyvinyl acetal has high toughness and flexural stiffness and also has excellent properties of high adhesiveness to glass or the like. Accordingly, in the case of using a polyvinyl acetal as an interlayer filling material, occurrence of cracks or breakage in the surface protection panel or glass substrate can be prevented. Moreover, even when the personal digital assistant is broken on impact of a fall, prevention of scattering of glass fragments or the like can be expected. However, a touch panel laminate produced using an interlayer filling material for a touch panel containing a polyvinyl acetal sometimes displays images with color irregularity (yellowing).

The present invention aims to, in consideration of the state of the art, provide an interlayer filling material for a touch panel which is used for filling an interlayer space between a touch panel and another component or an interlayer space between transparent conductive films included in the touch panel in production of a personal digital assistant, is less likely to cause cracks or breakage in a surface protection panel or a glass substrate, and enables production of a touch panel laminate that is not likely to display images with color irregularity. The present invention also aims to provide a touch panel laminate produced using the interlayer filling material for a touch panel.

Solution to Problem

The present invention relates to an interlayer filling material for a touch panel used for filling an interlayer space between a touch panel and another component, or at least one of interlayer spaces included in the touch panel between transparent conductive films, between a glass sheet and one of the transparent conductive films, between a glass sheet and another glass sheet, between a glass sheet and a polarizing film, between a substrate and a glass sheet, between a substrate and one of the transparent conductive films, and between a substrate and a polarizing film, the interlayer filling material containing: a polyvinyl acetal; and a plasticizer, the interlayer filling material having a residual stress Kpa (25° C., 2 min) after two minutes at 25° C. of 300 kPa or less.

The present invention is specifically described in the following.

The present inventors studied about the cause of color irregularity (yellowing) of images in a touch panel laminate produced using an interlayer filling material for a touch panel containing a polyvinyl acetal.

Owing to its high toughness and flexural stiffness at normal temperature, an interlayer filling material for a touch panel containing a polyvinyl acetal can prevent occurrence of cracks or breakage in a surface protection panel or a glass substrate. In the case of using such a hard polyvinyl acetal, however, the stress applied during the production of a touch panel laminate tends to be left in the interlayer filling material for a touch panel. In conventional production of a touch panel laminate, an interlayer filling material for a touch panel is sandwiched between a surface protection panel and a touch panel, and a pre-lamination is carried out at 75° C. for two seconds. Then, lamination is carried out under vacuum at 25° C. for two minutes or under vacuum at 75° C. for two minutes, followed by an autoclave treatment at 75° C. for 30 minutes. In the above process, stress is applied to the interlayer filling material for a touch panel. The stress is non-uniform at steps formed by decorative printing portions or wiring of the substrate or the like to be bonded. The present inventors found out that such non-uniform stress is left in the interlayer filling material for a touch panel to cause a distortion in part of liquid crystals, resulting in color irregularity (yellowing). In particular, the stress applied at 25° C. is presumably left in the interlayer filling material for a touch panel to cause a significant distortion.

As a result of further intensive studies, the present inventors found out that, in a case where the residual stress Kpa (25° C., 2 min) after two minutes at 25° C. is set to a certain level or lower in an interlayer filling material for a touch panel containing a polyvinyl acetal and a plasticizer, occurrence of color irregularity (yellowing) in the resulting touch panel laminate can be prevented. The present invention was thus completed.

The interlayer filling material for a touch panel of the present invention is used for filling an interlayer space between a touch panel and another component or an interlayer space between transparent conductive films included in the touch panel. Another component mentioned above is not particularly limited, and is preferably a surface protection panel (e.g., a glass sheet, a polycarbonate sheet, an acrylic sheet) or a polarizing film. In other words, the interlayer filling material for a touch panel of the present invention is preferably used for filling an interlayer space between a surface protection panel and a touch panel and/or an interlayer space between the touch panel and a polarizing film.

The interlayer filling material for a touch panel of the present invention has a residual stress Kpa (25° C., 2 min) after two minutes at 25° C. of 300 kPa or less. With the residual stress Kpa at 25° C. after two minutes set within such a range, occurrence of color irregularity (yellowing) in the resulting touch panel laminate can be prevented. The residual stress Kpa (25° C., 2 min) after two minutes at 25° C. is preferably 240 kPa or less, more preferably 200 kPa or less.

The interlayer filling material for a touch panel of the present invention preferably has a stress relaxation rate after two minutes at 25° C. of 75% or higher. With such a stress relaxation rate, occurrence of color irregularity (yellowing) in the resulting touch panel laminate can be further prevented. The stress relaxation rate after two minutes at 25° C. is more preferably 80% or higher, still more preferably 90% or higher.

The residual stress Kpa (25° C., 2 min) after two minutes at 25° C. can be measured in conformity with JIS K 6263:2004.

Specifically, a rectangle measurement sample (initial size: 10 mm in width×about 100 mm in length×about 0.2 mm in thickness (thickness is measured for each sample)) is prepared and held by chucks at an initial chuck interval of 50 mm. The measurement sample is placed in a constant-temperature bath at 25° C. After the temperature is stabilized, the sample is pulled at a rate of 500 ram/min using a TENSILON RTC (Orientec Co., Ltd.) or the like with the crosshead set to stop when the sample is pulled for 5 mm. The stress is measured every 0.5 seconds from the start of pulling to obtain data of the maximum stress and the stress after two minutes from the start. The stress relaxation rate after two minutes at 25° C. is a value in percentage obtained by dividing the stress after two minutes by the maximum stress and then subtracting the resulting value from 1.

The interlayer filling material for a touch panel of the present invention contains a polyvinyl acetal and a plasticizer. Adjustment of the type of the polyvinyl acetal and the amount of the plasticizer enables control of the residual stress Kpa (25° C., 2 min) after two minutes at 25° C. within a desired range.

The polyvinyl acetal can be prepared by saponifying polyvinyl acetate to prepare polyvinyl alcohol and then acetalizing the polyvinyl alcohol with an aldehyde in the presence of a catalyst. The degree of saponification of the polyvinyl alcohol is not particularly limited, and is commonly within a range of 70 to 99.9 mol %. The degree of saponification of the polyvinyl alcohol is preferably 70 to 99.8 mol %, more preferably 80 to 99.8 mol %.

For acetalization of the polyvinyl alcohol with an aldehyde in the presence of a catalyst, a solution containing the polyvinyl alcohol may be used. An exemplary solvent used for the solution containing the polyvinyl alcohol is water.

The aldehyde is not particularly limited. Commonly, a C1-C10 aldehyde is favorably used.

The C1-C10 aldehyde is not particularly limited, and may be either a linear aldehyde or a branched aldehyde. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred are n-butyraldehyde, n-hexylaldehyde, and n-valeraldehyde, and more preferred is n-butyraldehyde. These aldehydes may be used alone, or in combination of two or more thereof.

In other words, the polyvinyl acetal preferably contains polyvinyl butyral (when the aldehyde is n-butyraldehyde, the polyvinyl acetal is referred to as polyvinyl butyral). The use of the polyvinyl butyral allows the interlayer filling material for a touch panel to exhibit appropriate adhesiveness to glass, leading to better light resistance or weather resistance. Two or more types of polyvinyl acetals may be optionally used.

From the standpoint of lowering the residual stress, the average degree of polymerization of the polyvinyl acetal is preferably 2,000 or lower. With the average degree of polymerization of the polyvinyl acetal of 2,000 or lower, the residual stress of the resulting interlayer filling material for a touch panel can be controlled within a desired range by adjusting the amount of the plasticizer or using a later-described reactive diluent in combination. The upper limit of the average degree of polymerization of the polyvinyl acetal is more preferably 1,800, still more preferably 1,500, particularly preferably 900. The lower limit of the average degree of polymerization of the polyvinyl acetal is not particularly limited. From the standpoint of ensuring sufficient toughness or flexural stiffness and reducing cracks or breakage in the surface protection panel or the glass substrate, the average degree of polymerization of the polyvinyl acetal is preferably 200 or higher, more preferably 500 or higher.

The average degree of polymerization of the polyvinyl acetal as used herein refers to a viscosity average degree of polymerization determined by a method described in JIS K6728:1977. In a case where the polyvinyl acetal resin used is a mixture of two or more types of polyvinyl acetal resins, the average degree of polymerization of the polyvinyl acetal refers to an apparent viscosity average degree of polymerization of the whole polyvinyl acetal resin mixture.

The average degree of polymerization of the polyvinyl acetal is identical to the average degree of polymerization of the polyvinyl alcohol used in production of the polyvinyl acetal. In other words, polyvinyl alcohol resin and polyvinyl acetal resin obtained by acetalizing the polyvinyl alcohol resin have the same degree of polymerization.

The average degree of polymerization of the polyvinyl alcohol as used herein refers to a viscosity average degree of polymerization obtained based on JIS K6726:1994. In a case where the polyvinyl alcohol resin used is a mixture of two or more types of polyvinyl alcohol resins, the average degree of polymerization of the polyvinyl alcohol refers to an apparent viscosity average degree of polymerization of the whole polyvinyl alcohol resin mixture.

The lower limit of the amount of hydroxy groups (hydroxy group content) of the polyvinyl acetal is preferably 16 mol %, and the upper limit thereof is preferably 45 mol %. When the hydroxy group content is 16 mol % or more, the adhesiveness of the interlayer filling material for a touch panel to glass is improved. When the hydroxy group content is 45 mol % or less, the moisture resistance and weather resistance are improved. The lower limit of the hydroxy group content is more preferably 18 mol %, still more preferably 20 mol %, particularly preferably 22 mol %. The upper limit thereof is more preferably 40 mol %, still more preferably 38 mol %, further preferably 36 mol %, particularly preferably 35 mol %.

The hydroxy group content of the polyvinyl acetal is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined, for example, by the method in conformity with JIS K6728 "Testing methods for polyvinyl butyral".

The lower limit of the degree of acetylation (acetyl group content) of the polyvinyl acetal is preferably 0.1 mol %, and the upper limit thereof is preferably 30 mol %. When the acetyl group content is 0.1 mol % or more, the compatibility with the reactive diluent is enhanced. When the acetyl group content is 30 mol % or less, the moisture resistance of the polyvinyl acetal is improved. When the acetyl group content is more than 30 mol %, the reaction efficiency during the production of the polyvinyl acetal may be lowered. The lower limit of the acetyl group content is more preferably 0.2 mol %, still more preferably 0.3 mol %. The upper limit thereof is more preferably 24 mol %, still more preferably 20 mol %, further preferably 19.5 mol %, particularly preferably 15 mol %.

The acetyl group content of the polyvinyl acetal is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be determined, for example, in conformity with JIS K6728 "Testing methods for polyvinyl butyral".

The acetyl group content of the polyvinyl acetal is controlled within the above range, for example, by adjusting the degree of saponification of the polyvinyl alcohol. In other words, the acetyl group content of the polyvinyl acetal depends on the degree of saponification of the polyvinyl alcohol. In the case where the polyvinyl alcohol used has a lower degree of saponification, the acetyl group content of the polyvinyl acetal becomes larger. By contrast, in the case where the polyvinyl alcohol used has a higher degree of saponification, the acetyl group content of the polyvinyl acetal becomes smaller.

The lower limit of the degree of acetalization of the polyvinyl acetal is preferably 50 mol %, and the upper limit thereof is preferably 85 mol %. When the degree of acetalization is 50 mol % or higher, the compatibility with the reactive diluent is enhanced. When the degree of acetalization is 85 mol % or lower, the reaction time needed for the production of the polyvinyl acetal can be shortened. The lower limit of the degree of acetalization is more preferably 54 mol %, still more preferably 58 mol %, particularly preferably 60 mol %. The upper limit of the degree of acetalization is more preferably 82 mol %, still more preferably 79 mol %, particularly preferably 77 mol %.

The degree of acetalization of the polyvinyl acetal is a value in percentage of the mole fraction (mol %) obtained by dividing the amount of ethylene groups to which acetal groups are bonded by the total amount of ethylene groups of the main chain. The degree of acetalization can be determined by measuring the acetyl group content and the vinyl alcohol content (amount of hydroxy groups) by the method in conformity with JIS K6728 "Testing methods for polyvinyl butyral", calculating the mole fraction based on the measurement results, and subtracting the acetyl group content and the vinyl alcohol content from 100 mol %.

The degree of acetalization of the polyvinyl acetal can be controlled, for example, by adjusting the amount of the aldehyde. When the amount of the aldehyde is smaller, the degree of acetalization of the polyvinyl acetal is lowered. When the amount of the aldehyde is larger, the degree of acetalization of the polyvinyl acetal is increased.

The plasticizer is not particularly limited and a conventionally known plasticizer usable for polyvinyl acetals may be used. Examples of the plasticizer include organic acid ester plasticizers such as monobasic organic acid esters and polybasic organic acid esters, and phosphoric acid plasticizers such as organophosphate plasticizers and organophosphite plasticizers. Preferred among these are organic acid ester plasticizers. These plasticizers may be used alone or in combination of two or more thereof. The plasticizer is preferably a liquid plasticizer.

The monobasic organic acid ester is not particularly limited, and examples thereof include glycol esters obtainable by reaction between a monobasic organic acid (e.g., butyric acid, isobutyric acid, caproic acid, 2-. 30 ethylbutyric acid, heptanoic acid, n-octylic acid, 2-ethylhexylic acid, pelargonic acid (n-nonylic acid), decylic acid) and a glycol (e.g., triethylene glycol, tetraethylene glycol, tripropylene glycol).

The polybasic organic acid ester is not particularly limited, and examples thereof include ester compounds obtainable by reaction between a polybasic organic acid (e.g., adipic acid, sebacic acid, azelaic acid) and a C4-C8 linear or branched alcohol.

The organic acid ester plasticizer is preferably a diester plasticizer represented by the following formula (1). The use of the diester plasticizer improves the moldability of the interlayer filling material for a touch panel.

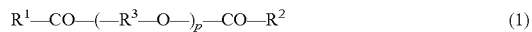

$$R^1-CO-(-R^3-O-)_p-CO-R^2 \qquad (1)$$

In the formula (1), $R^1$ and $R^2$ each represent a C5-C10 (preferably C6-C10) organic group, $R^3$ represents an ethylene, isopropylene, or n-propylene group, and p represents an integer of 3 to 10.

Specific examples of the organic acid ester include triethylene glycol-di-2-ethylbutyrate, triethylene glycol-di-2-ethylhexanoate, triethylene glycol dicaprylate, triethylene glycol-di-n-octanoate, triethylene glycol-di-n-heptanoate, tetraethylene glycol-di-n-heptanoate, tetraethylene glycol-di-2-ethylhexanoate, dibutyl sebacate, dioctyl azelate, dibutyl carbitol adipate, ethylene glycol-di-2-ethyl butyrate, 1,3-propylene glycol-di-2-ethyl butyrate, 1,4-butylene glycol-di-2-ethylbutyrate, diethylene glycol-di-2-ethylbutyrate, diethylene glycol-di-2-ethylhexanoate, dipropylene glycol-di-2-ethylbutyrate, triethylene glycol-di-2-ethylpentanoate, tetraethylene glycol-di-2-ethylbutyrate, diethylene glycol dicaprylate, dihexyl adipate, dioctyl adipate, hexylcyclohexyl adipate, diisononyl adipate, heptylnonyl adipate, oil-modified alkyd sebacate, mixtures of phosphate esters and adipic acid esters, and mixed type adipic acid esters prepared from a C4-C9 alkyl alcohol and a C4-C9 cyclic alcohol.

The organophosphate plasticizers are not particularly limited, and examples thereof include tributoxyethyl phosphate, isodecylphenyl phosphate, and triisopropyl phosphate.

Among the plasticizers, preferred is at least one selected from the group consisting of dihexyl adipate (DHA), triethylene glycol-di-2-ethylhexanoate (3GO), tetraethylene glycol-di-2-ethylhexanoate (4GO), triethylene glycol-di-2-ethyl butyrate (3GH), tetraethylene glycol-di-2-ethyl butyrate (4GH), tetraethylene glycol-di-n-heptanoate (4G7) and triethylene glycol-di-n-heptanoate (3G7). More preferred are triethylene glycol-di-2-ethyl butyrate, triethylene glycol-di-n-heptanoate (3G7), and triethylene glycol-di-2-ethylhexanoate (3GO), and still more preferred is triethylene glycol-di-2-ethylhexanoate.

The amount of the plasticizer is not particularly limited. The lower limit of the amount of the plasticizer relative to 100 parts by weight of the polyvinyl acetal is preferably 10 parts by weight and the upper limit thereof is preferably 75 parts by weight. With the amount of the plasticizer within this range, the residual stress of the resulting interlayer filling material for a touch panel can be adjusted within a desired range. The lower limit of the amount of the plasticizer is more preferably 15 parts by weight and the upper limit thereof is more preferably 40 parts by weight.

The interlayer filling material for a touch panel of the present invention preferably further contains a reactive diluent and a photopolymerization initiator. When the interlayer filling material for a touch panel containing a reactive diluent and a photopolymerization initiator is irradiated with light, the reactive diluent reacts to cause crosslinking and curing reactions, thereby increasing the storage modulus G' of the interlayer filling material for a touch panel. The residual stress of the interlayer filling material for a touch panel can be easily controlled within a desired range by utilizing this reaction. Specifically, the interlayer filling material for a touch panel containing a reactive diluent and a photopolymerization initiator is pressure-bonded under heating at around 70° C. without irradiation with light to sufficiently follow steps at decorative printing portions and wiring, thereby preventing non-uniform stress from being left at the steps. Then, the interlayer filling material is irradiated with light to react the reactive diluent, thereby causing crosslinking and curing reactions. Thus, the toughness and flexural stiffness of the entire interlayer filling material for a touch panel are improved to prevent cracks or breakage in the surface protection panel or the glass substrate. Moreover, the reactive diluent reacted by irradiation with light does not remain in the interlayer filling material or bleed out therefrom.

The reactive diluent as used herein refers to an agent that is compatible with the polyvinyl acetal and molecules thereof react with each other by irradiation with light to cause crosslinking and curing reactions.

Examples of the reactive diluent include (meth)acrylic reactive diluents such as (meth)acrylic monomers and (meth)acrylic oligomers, epoxy reactive diluents such as epoxy monomers and epoxy oligomers, and silicone reactive diluents such as alkoxysilane monomers and alkoxysilane oligomers. These reactive diluents may be used alone or in combination of two or more thereof. Preferred among these are (meth)acrylic reactive diluents because they are highly compatible with the polyvinyl acetal and easily cause crosslinking and curing reactions when used in combination with a photopolymerization initiator.

The (meth)acrylic monomer used may be a monofunctional, bifunctional, or tri- or higher functional (meth)acrylic monomer.

Examples of the monofunctional (meth)acrylic monomer include methyl (meth)acrylate, ethyl (meth)acrylate, propyl (meth) acrylate, butyl (meth) acrylate, 2-hydroxyethyl (meth)acrylate, diethylene glycol monoethyl ether (meth) acrylate, isobornyl (meth)acrylate, 3-methoxybutyl (meth) acrylate, 2-acryloyloxyethyl-2-hydroxypropyl phthalate, and 2-methacryloyloxyethyl-2-hydroxylpropyl phthalate.

Examples of the bifunctional (meth)acrylic monomer include ethylene glycol di(meth)acrylate, diethylene glycol di(meth)acrylate, tetraethylene glycol di(meth)acrylate, 1,6-hexanediol dimethacrylate, 1,9-nonanediol diacrylate, polytetramethylene glycol di(meth)acrylate, neopentyl glycol di(meth)acrylate, 1,3-butylene glycol di(meth)acrylate, and 2,2-bis[4-(methacryloxyethoxy) phenyl]propane di(meth) acrylate.

Examples of the tri- or higher functional (meth)acrylic monomer include trimethylolpropane triacrylate, pentaerythritol triacrylate, pentaerythritol trimethacrylate, pentaerythritol tetramethacrylate, dipentaerythritol pentaacrylate, dipentaerythritol hexaacrylate, tri(2-acryloyloxy ethyl) phosphate, tetramethyrolmethane tri(meth)acrylate, tetramethylol propane tetra(meth)acrylate, triallyl isocyanurate, and derivatives thereof.

The above (meth)acrylic monomers may be used alone, or in combination of two or more thereof. In particular, preferred are monofunctional (meth)acrylic monomers as they are particularly excellent in compatibility with the polyvinyl acetal. More specifically, preferred are methyl (meth)acrylate, ethyl (meth)acrylate, propyl (meth)acrylate, butyl (meth)acrylate, and 2-hydroxyethyl acrylate.

Examples of the (meth)acrylic oligomers include those including a plurality of the (meth)acrylic monomers bonded to each other. In particular, preferred is a (meth)acrylic oligomer prepared from the acrylic monomer because such an oligomer is particularly excellent in compatibility with the polyvinyl acetal.

Examples of the epoxy monomers include: glycidyl ester epoxy monomers of bisphenol A type, bisphenol F type, bisphenol AD type, bromine-containing bisphenol A type, phenol novolac type, cresol novolac type, polyphenol type, linear aliphatic type, butadiene type, urethane type and the like; aliphatic glycidyl ester epoxy monomers such as glycidyl hexahydrophthalate, dimer glycidyl ester, aromatic type, cycloaliphatic type and like epoxy monomers; methyl-substituted epoxy monomers of bisphenol type, ester type, high-molecular-weight ether ester type, ether ester type, bromine type, novolac type, and the like; heterocyclic epoxy monomers; glycidyl amine epoxy monomers such as triglycidyl isocyanurate and tetraglycidyl diaminodiphenyl methane; linear aliphatic epoxy monomers such as epoxylated polybutadiene and epoxy soybean oil; cycloaliphatic epoxy monomers; naphthalene novolac-type epoxy monomers; and diglycidyl oxynaphthalene epoxy monomers.

Examples of the epoxy oligomers include those including a plurality of the epoxy monomers bonded to each other. Preferred among these are epoxy oligomers prepared from the epoxy monomers.

Examples of the alkoxysilane monomers include methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltrimethoxysilane, decyltrimethoxysilane, and 1,6-bis(trimethoxysilyl)hexane.

Examples of the alkoxysilane oligomers include those including a plurality of the alkoxysilane monomers bonded to each other. Preferred among these are alkoxysilane oligomers prepared from the alkoxysilane monomers.

The amount of the reactive diluent in the interlayer filling material for a touch panel of the present invention is not particularly limited. The lower limit of the amount of the reactive diluent relative to 100 parts by weight of the polyvinyl acetal is preferably 0.1 parts by weight and the upper limit thereof is preferably 30 parts by weight. The amount of the reactive diluent within the above range facilitates control of the residual stress of the interlayer filling material for a touch panel prior to the reaction of the reactive diluent within a desired range. The lower limit of the amount of the reactive diluent is more preferably 1 part by weight and the upper limit thereof is more preferably 20 parts by weight. The lower limit is still more preferably 2 parts by weight and the upper limit is still more preferably 15 parts by weight. The lower limit is particularly preferably 3 parts by weight and the upper limit is particularly preferably 10 parts by weight.

The photopolymerization initiator may be appropriately selected in accordance with the type of the reactive diluent. For example, in the case where a (meth)acrylic reactive diluent is used as the reactive diluent, for example, a persulfate, an organic peroxide, an azo compound may be used. These photopolymerization initiators may be used alone, or in combination of two or more thereof.

The amount of the photopolymerization initiator in the interlayer filling material for a touch panel of the present invention is not particularly limited. The lower limit thereof is preferably 0.01 parts by weight and the upper limit thereof is preferably 5 parts by weight, relative to 100 parts by weight of the reactive diluent. When the amount of the photopolymerization initiator is within this range, the reactive diluent can be reacted surely and in a short time. Moreover, bleeding of the residual photopolymerization initiator is not likely to occur. The lower limit of the amount of the photopolymerization initiator is more preferably 0.1 parts by weight and the upper limit thereof is more preferably 2 parts by weight.

The interlayer filling material for a touch panel containing a reactive diluent and a photopolymerization initiator may be irradiated with light by any method. In an exemplary method, an ultraviolet light irradiation device such as an ultra-high pressure mercury lamp is used for irradiation with light.

The wavelength or illuminance of the light used in the irradiation may be appropriately determined in accordance with the types of the reactive diluent and the photopolymerization initiator or the like. For example, when the reactive diluent used is a (meth)acrylic reactive diluent and the photopolymerization initiator used is benzophenone in an amount of 0.5 to 2 parts by weight relative to 100 parts by weight of the reactive diluent, preferred is irradiation with light having a wavelength of 365 nm at a dose of 2,000 to 6,000 mJ/cm$^2$.

The interlayer filling material for a touch panel of the present invention may contain, if needed, known additives such as an adhesion modifier, a tackifier resin, a plasticizer, an emulsifier, a softener, fine particles, a filler, a pigment, a dye, a silane coupling agent, an antioxidant, a surfactant, and wax to the extent that would not lower the transparency.

The interlayer filling material for a touch panel of the present invention may be produced by any method. An exemplary method includes mixing the polyvinyl acetal, reactive diluent, photopolymerization initiator, and optionally used additives.

The application of the interlayer filling material for a touch panel of the present invention is not particularly limited, and may be used as a bonding (adhesive) sheet for various applications. Specifically, for example, the interlayer filling material for a touch panel of the present invention is preferably used for at least one interlayer space selected from the group consisting of an interlayer space between a surface protection panel and a touch panel, an interlayer space between the touch panel and a polarizing film, and interlayer spaces included in the touch panel between transparent conducive films, between a glass sheet and one of the transparent conducive films, between a glass sheet and another glass sheet, between a glass sheet and a polarizing film, between a substrate and a glass sheet, between a substrate and one of the transparent conducive films, and between a substrate and a polarizing film in a personal digital assistant (e.g., smartphones, tablet PCs) or a flat-type or flexible-type image display device (e.g., electronic paper, PDAs, TVs, game machines) including an image display panel such as LCD, EL, or PDP. Adherends can be directly bonded to be fixed using the interlayer filling material for a touch panel of the present invention.

FIG. 1 is a cross-sectional view schematically illustrating an exemplary application of the interlayer filling material for a touch panel of the present invention. In FIG. 1, the interlayer space between a surface protection panel 3 and a touch panel 2 and the interlayer space between the touch panel 2 and a polarizing film 4 are filled with the interlayer filling material for a touch panel 1 of the present invention.

In FIG. 1, decorative printing portions 5 are formed at the periphery on the rear side of the surface protection panel 3 for the purpose of masking or the like, and the interlayer filling material for a touch panel 1 of the present invention sufficiently follows steps formed by such decorative printing portions 5 and steps (not illustrated) of the wiring formed in the touch panel 2.

The present invention also encompasses a touch panel laminate including: a touch panel; and the interlayer filling material for a touch panel of the present invention, the interlayer filling material for a touch panel filling at least one interlayer space selected from the group consisting of an interlayer space between a surface protection panel and the touch panel, an interlayer space between the touch panel and a polarizing film, and interlayer spaces included in the touch panel between transparent conductive films, between a glass sheet and one of the transparent conductive films, between a glass sheet and another glass sheet, between a glass sheet and a polarizing film, between a substrate and a glass sheet, between a substrate and one of the transparent conductive films, and between a substrate and a polarizing film.

The surface protection panel is not particularly limited, and may be one commonly used for personal digital assistants, flat-type or flexible-type image display devices, or the like, such as a glass sheet, a polycarbonate sheet, or an acrylic sheet.

The touch panel is not particularly limited, and may be one commonly used for personal digital assistants, flat-type or flexible-type image display devices, or the like, such as a touch panel including a plurality of layers (e.g., ITO film). The configuration of the touch panel is not particularly limited, and examples thereof include the out-cell type, in-cell type, on-cell type, cover glass-integrated type, and cover sheet-integrated type.

The system of the touch panel is also not particularly limited, and examples thereof include the resistive film type, capacitive type, optical type, and ultrasonic type.

The polarizing film is also not particularly limited, and may be one commonly used for personal digital assistants, flat-type or flexible-type image display devices, or the like.

The method for producing a laminate by filling at least one interlayer space selected from the group consisting of an interlayer space between a surface protection panel and a touch panel, an interlayer space between the touch panel and a polarizing film, and an interlayer space between transparent conductive films included in the touch panels, with the interlayer filling material for a touch panel of the present invention is not particularly limited, and a conventionally known method may be employed.

Advantageous Effects of Invention

The present invention can provide an interlayer filling material for a touch panel which is used for filling an interlayer space between a touch panel and another component or an interlayer space between transparent conductive films included in the touch panel in production of a personal digital assistant, is less likely to cause cracks or breakage in a surface protection panel or a glass substrate, and enables production of a touch panel laminate that is not likely to display images with color irregularity. The present invention can also provide a touch panel laminate produced using the interlayer filling material for a touch panel.

BRIEF DESCRIPTION OF DRAWINGS

FIG. 1 is a cross-sectional view schematically illustrating an exemplary application of the interlayer filling material for a touch panel of the present invention.

DESCRIPTION OF EMBODIMENTS

Embodiments of the present invention will be specifically described in the following with reference to, but not limited to, the examples.

<Preparation of Polyvinyl Butyral>

A reactor equipped with a stirrer was charged with 2,700 mL of ion exchange water and 300 g of polyvinyl alcohol having an average degree of polymerization of 1,800 and a degree of saponification of 99.3 mol %, and the contents were heated with stirring to be dissolved, thereby preparing a solution. To the obtained solution was added as a catalyst 35% by weight hydrochloric acid such that the hydrochloric acid concentration was set to 0.2% by weight. The temperature of the mixture was adjusted to 15° C., and 21 g of n-butyraldehyde (n-BA) was added thereto with stirring. Then, 145 g of n-butyraldehyde (n-BA) was further added, so that a polyvinyl butyral resin in the form of white particles was precipitated. Fifteen minutes after the precipitation, 35% by weight hydrochloric acid was added such that the hydrochloric acid concentration was set to 1.8% by weight. The mixture was heated to 50° C. and aged at 50° C. for two hours. After cooling and neutralization of the solution, the polyvinyl butyral resin was washed with water and then dried, thereby preparing polyvinyl butyral 1 (PVB1).

The obtained PVB 1 had an average degree of polymerization of 1,700, a hydroxy group content of 31.3 mol %, an acetyl group content of 0.7 mol %, and a degree of butyralization (Bu degree) of 68.0 mol %.

Further, polyvinyl butyral 2 (PVB2) to polyvinyl butyral 5 (PVB5) were prepared by selecting the type of polyvinyl alcohol as a raw material and setting the conditions for butyralization.

Table 1 shows each polyvinyl butyral obtained.

TABLE 1

|  | PVB1 | PVB2 | PVB3 | PVB4 | PVB5 |
|---|---|---|---|---|---|
| Hydroxy group content (mol %) | 31.3 | 31.3 | 31.3 | 31.3 | 31.3 |
| Butyralization degree (mol %) | 68.0 | 68.0 | 68.0 | 68.0 | 68.0 |
| Acetyl group content (mol %) | 0.7 | 0.7 | 0.7 | 0.7 | 0.7 |
| Average degree of polyemrization | 1700 | 850 | 650 | 250 | 2500 |

Example 1

To 100.0 parts by weight of PVB 2 was added 25 parts by weight of triethylene glycol-di-2-ethylhexanoate (3GO) as a plasticizer, and the mixture was sufficiently kneaded, thereby preparing an interlayer filling material for a touch panel.

An amount of 2 g of the obtained interlayer filling material for a touch panel was placed in a molding frame (2 cm in length×12 cm in width×0.2 mm in thickness) that was positioned between two polyethylene terephthalate (PET) films. The interlayer filling material was pre-heated at a temperature of 150° C. and a pressure of 0 kg/cm² for 10 minutes and then pressed at 80 kg/cm² for 15 minutes. Then, the resulting laminate was transferred to a hand press preliminarily set at 20° C. The laminate was pressed to be cooled at 10 MPa for 10 minutes. After the cooling, one PET film was peeled, and the resulting interlayer filling material was placed in a constant temperature and humidity room (humidity: 30% (±3%), temperature: 23° C.) for 24 hours. The obtained sheet was cut into a rectangle measurement sample with an initial size of 10 mm in width×about 100 mm in length×about 0.2 mm in thickness.

The residual stress Kpa (25° C., 2 min) after two minutes at 25° C. and the stress relaxation rate after two minutes at 25° C. of the obtained measurement sample were measured by a method in conformity with JIS K 6263:2004. Specifically, the measurement sample was held by chucks at an initial chuck interval of 50 mm, and placed in a constant-temperature bath at 25° C. After the temperature is stabilized, the measurement sample was pulled at a rate of 500 mm/min using a TENSILON RTC (Orientec Co., Ltd.) with the crosshead set to stop when the measurement sample was pulled for 5 mm. The stress was measured every 0.5 seconds from the start of pulling to obtain data of the maximum stress and the stress after two minutes from the start. Thus, the residual stress Kpa (25° C., 2 min) after two minutes at 25° C. and the stress relaxation rate after two minutes at 25° C. were obtained.

Examples 2 to 6, Comparative Example 1

An interlayer filling material for a touch panel was prepared in the same manner as in Example 1 except that the type of the polyvinyl butyral and the amount of the plasticizer were changed as shown in Table 2. Using the obtained interlayer filling material for a touch panel, the residual stress and the stress relaxation rate were measured.

Example 7

To 100 parts by weight of PVB 1 were added 35 parts by weight of triethylene glycol-di-2-ethylhexanoate (3GO) as a plasticizer and 30 parts by weight of trimethylolpropane triacrylate (TMPA) as a reactive diluent. The mixture was sufficiently stirred, thereby obtaining a mixture composition. The mixture composition was sufficiently mixed with benzophenone (BP) as a photopolymerization initiator in an amount of 1 part by weight relative to 100 parts by weight of the reactive diluent, thereby obtaining an interlayer filling material for a touch panel.

The residual stress and the stress relaxation rate of the obtained interlayer filling material for a touch panel were measured by the same method as in Example 1. The residual stress and the stress relaxation rate were measured without irradiation of the interlayer filling material for a touch panel with light.

Examples 8 to 14, Comparative Example 2

An interlayer filling material for a touch panel was prepared in the same manner as in Example 7 except that the composition was set as shown in Table 3, and the residual stress and the stress relaxation rate thereof were measured.

In Table 3, 3EGA refers to triethylene glycol diacrylate and TMPMA refers to trimethylolpropane trimethacrylate.

Comparative Example 3

(1) Preparation of an Acrylic Copolymer

An amount of 65.0 parts by weight of n-butyl acrylate, 26.0 parts by weight of methyl methacrylate, 4.0 parts by weight of ethyl acrylate, 1.0 part by weight of hydroxy ethyl acrylate, 4.0 parts by weight of acrylic acid, and 0.2 parts by weight of 2,2'-azobisisobutyronitrile as a polymerization initiator were dissolved in 100 parts by weight of ethyl acetate in a reaction vessel equipped with a stirrer, a reflux condenser, a thermometer, and a nitrogen gas inlet. After the air inside the reaction vessel was substituted with nitrogen, the solution was polymerized at 80° C. for eight hours to give an acrylic copolymer.

The obtained acrylic copolymer was diluted with tetrahydrofuran (THF) by a factor of 50 times. The resulting diluted solution was passed through a filter (material: polytetrafluoroethylene, pore size: 0.2 µm) to prepare a measurement sample. The obtained measurement sample was placed in a gel permeation chromatograph (produced by Waters, 2690 Separations Model) and subjected to GPC measurement under the conditions of a sample flow rate of 1 ml/min and a column temperature of 40° C. The molecular weight of the acrylic copolymer in terms of polystyrene was thus determined. Based on the measurement result, the weight average molecular weight (Mw) was obtained. The obtained acrylic copolymer had a weight average molecular weight of 650,000.

The column used was GPC LF-804 (Showa Denko K.K.) and the detector used was a differential refractometer.

(2) Preparation of an Interlayer Filling Material for a Touch Panel

An amount of 100 parts by weight of the obtained acrylic copolymer was diluted with ethyl acetate to give an adhesive solution with a resin solid content of 45%. An amount of 100 parts by weight of the adhesive solution was blended with 1 part by weight of an isocyanate crosslinking agent (produced by Nippon Polyurethane Industry Co., Ltd., Coronate L-45, solid content: 45%), stirred for 15 minutes, applied to a mold release-treated surface of a mold release PET film with a thickness of 50 µm to a dry thickness of 200 µm, and dried at 80° C. for 15 minutes. On the obtained adhesive layer was placed another mold release PET film in such a manner that the mold release-treated surface thereof was in contact with the adhesive layer, thereby preparing a laminate. The resulting sheet was left to stand at 23° C. for five days to give an interlayer filling material for a touch panel (thickness: 200 µm) having a mold release PET film attached to each surface.

The residual stress and the stress relaxation rate of the obtained interlayer filling material for a touch panel were measured in the same manner as in Example 1.

(Evaluation)

The interlayer filling materials for a touch panel obtained in the examples and comparative examples were evaluated by the following methods. Tables 2 and 3 show the results.

In the tables, the number of parts of the photopolymerization initiator is a value relative to 100 parts by weight of the reactive diluent.

(1) Evaluation of Impact Resistance

The interlayer filling material for a touch panel was attached to a tempered glass sheet with a size of 10 cm×7.0 cm and a thickness of 0.7 mm. To the other surface of the interlayer filling material for a touch panel was attached a corona-treated polycarbonate sheet with a size of 10 cm×7.0 cm and a thickness of 3 mm, thereby preparing a tempered glass/interlayer filling material for a touch panel/polycarbonate structure. This laminate was treated in an autoclave at 75° C. and 0.5 MPa for 30 minutes.

The structures obtained using the interlayer filling materials of Examples 7 to 11 and Comparative Example 2 were irradiated with light having a wavelength of 365 nm at a dose of 4,000 mJ/cm$^2$ using an ultra-high pressure mercury lamp.

The obtained laminate was fixed in a stainless-steel frame (inner size: 60 cm×90 cm), and an iron ball (133 g) was dropped to the central portion of the laminate from the height of 155 cm in an environment of 23° C. The laminate having no cracks after the dropping was rated "○ (Good)" and the laminate having cracks after the dropping was rated "x (Poor)".

(2) Evaluation of Color Irregularity

A single-sided adhesive tape in the shape of a square frame (outer frame: 76 mm×52 mm, inner frame: 56 mm×32 mm) was attached to a white plate glass sheet (S9112 available from Matsunami Glass Ind., Ltd., size: 76 mm×52 mm, thickness: 1.1 mm) to form a step with a thickness of 25 µm.

The interlayer filling material for a touch panel was cut to a size of 76 mm×52 mm and attached to the surface of the steps formed on the white plate glass. The obtained structure was subjected to pre-lamination by holding at 75° C. for two seconds. Then, the resulting structure was attached to a polarizer surface of a liquid crystal module (liquid crystal module for NEXUS 7 available from Microsoft Corporation) using a vacuum laminator under the conditions of 75° C. and 100 Pa, followed by pressure-bonding with heat in an autoclave at 75° C. and 0.5 MPa for 30 minutes. An evaluation sample was thus prepared.

The liquid crystal module of the obtained evaluation sample was lit in white so that the whole LCD screen had the uniform luminance and chromaticity, and the obtained laminate was visually observed. The case where no color irregularity (yellowing) was observed at around the step was rated "o (Good)" and the case where color irregularity (yellowing) was observed was rated "x (Poor)". The same evaluation was performed while changing the height of the step to 35 μm and 40 μm.

(3) Evaluation of Adhesiveness

The interlayer filling material for a touch panel was cut to a size of 25 mm×100 mm and attached to glass. A plasma-treated PET film (25 mm×100 mm) was attached thereto and the laminate was vacuum-laminated at 25° C., followed by pressure bonding with heat in an autoclave at 75° C. and 0.5 MPa for 30 minutes. An evaluation sample was thus prepared. The obtained evaluation sample was subjected to 180° peel test at 300 ram/min in conformity with JIS K 6854:1994 for determining the peel strength.

TABLE 2

| | | Example 1 | Example 2 | Example 3 | Example 4 | Example 5 | Example 6 | Comparative Example 1 |
|---|---|---|---|---|---|---|---|---|
| Polyvinyl acetal | Type | PVB2 | PVB2 | PVB3 | PVB3 | PVB3 | PVB4 | PVB5 |
| | Degree of polymerization | 850 | 850 | 650 | 650 | 650 | 250 | 2500 |
| | Number of parts (parts by weight) | 100 | 100 | 100 | 100 | 100 | 100 | 100 |
| Plasticizer | Type | 3GO | 3GO | 3GO | 3GO | 3GO | 3GO | 3GO |
| | Number of parts (parts by weight) | 25 | 5 | 25 | 20 | 5 | 20 | 5 |
| Reactive diluent | Type | — | — | — | — | — | — | — |
| | Number of parts (parts by weight) | — | — | — | — | — | — | — |
| Photopolymerization initiator | Type | — | — | — | — | — | — | — |
| | Number of parts (parts by weight) | — | — | — | — | — | — | — |
| Residual stress (kPa) | Kpa (25° C., 2 min) | 100.0 | 290.0 | 134.5 | 165.0 | 230.0 | 100.0 | 400.0 |
| Stress relaxation rate (%) | 25° C., after 2 min | 95.7% | 95% | 96.5% | 95% | 97% | 97% | 70% |
| Evaluation | Evaluation of impact resistance | o | o | o | o | o | o | o |
| | Evaluation of color irregularity — Step of 25 um | o | o | o | o | o | o | x |
| | Step of 35 um | o | o | o | o | o | o | x |
| | Step of 40 um | o | o | o | o | o | o | x |
| | Peeling strength (N/25 mm) | 25 | 13 | 31 | 28 | 15 | 28 | 15 |

*Number of parts of photopolymerization initiator is a value relative to 100 parts by weight of reactive diluent

TABLE 3

| | | Example 7 | Example 8 | Example 9 | Example 10 | Example 11 | Example 12 | Example 13 | Example 14 | Comparative Example 2 | Comparative Example 3 |
|---|---|---|---|---|---|---|---|---|---|---|---|
| Polyvinyl acetal | Type | PVB1 | PVB1 | PVB2 | PVB2 | PVB2 | PVB5 | PVB2 | PVB2 | PVB1 | Acrylic copolymer |
| | Degree of polymerization | 1700 | 1700 | 850 | 850 | 850 | 2500 | 850 | 850 | 1700 | |
| | Number of parts (parts by weight) | 100 | 100 | 100 | 100 | 100 | 100 | 100 | 100 | 100 | |
| Plasticizer | Type | 3GO | 3GO | 3GO | 3GO | 3GO | 3GO | 3GO | 3GO | 3GO | |
| | Number of parts (parts by weight) | 35 | 30 | 20 | 15 | 10 | 30 | 20 | 10 | 5 | |
| Reactive diluent | Type | TMPA | TMPA | TMPA | TMPA | TMPA | TMPA | 3EGA | TMPMA | TMPA | |
| | Number of parts (parts by weight) | 30 | 4 | 6 | 6 | 20 | 4 | 8 | 20 | 5 | |
| Photopolymerization initiator | Type | BP | BP | BP | BP | BP | BP | BP | BP | BP | |
| | Number of parts (parts by weight) | 1 | 1 | 1 | 1 | 1 | 1 | 1 | 1 | 1 | |
| Residual stress (kPa) | Kpa (25° C., 2 min) | 57.2 | 166.7 | 100.0 | 212.5 | 95.0 | 265.0 | 100.0 | 92.0 | 310.0 | 330.0 |
| Stress relaxation rate (%) | 25° C., after 2 min | 80% | 78.8% | 95.7% | 97% | 96% | 72% | 96% | 97% | 73% | 65% |
| Evaluation | Evaluation of impact resistance | o | o | o | o | o | o | o | o | o | x |
| | Evaluation of color irregularity — Step of 25 um | o | o | o | o | o | o | o | o | x | x |
| | Step of 35 um | o | o | o | o | o | x | o | o | x | x |
| | Step of 40 um | x | x | o | o | o | x | o | o | x | x |
| | Peeling strength (N/25 mm) | 26 | 30 | 22 | 20 | 31 | 28 | 33 | 32 | 14 | 12 |

*Number of parts of photopolymerization initiator is a value relative to 100 parts by weight of reactive diluent

INDUSTRIAL APPLICABILITY

The present invention can provide an interlayer filling material for a touch panel which is used for filling an interlayer space between a touch panel and another component or an interlayer space between transparent conductive films included in the touch panel in production of a personal digital assistant, is less likely to cause cracks or breakage in a surface protection panel or a glass substrate, and enables production of a touch panel laminate that is not likely to display images with color irregularity. The present invention can also provide a touch panel laminate produced using the interlayer filling material for a touch panel.

REFERENCE SIGNS LIST

1: Interlayer filling material for a touch panel of the present invention
2: Touch panel
3: Surface protection panel
4: Polarizing film
5: Decorative printing portion

The invention claimed is:

1. An interlayer filling material for a touch panel used for filling an interlayer space between a touch panel and another component, or at least one of interlayer spaces included in the touch panel between transparent conductive films, between a glass sheet and one of the transparent conductive films, between a glass sheet and another glass sheet, between a glass sheet and a polarizing film, between a substrate and a glass sheet, between a substrate and one of the transparent conductive films, and between a substrate and a polarizing film, the interlayer filling material comprising: a polyvinyl acetal; and a plasticizer, the interlayer filling material having a residual stress Kpa (25° C., 2 min) after two minutes at 25° C. of 300 kPa or less as measured in conformity with JIS K 6263: 2004.

2. The interlayer filling material for a touch panel according to claim 1, wherein a stress relaxation rate after two minutes at 25° C. is 75% or higher, wherein the stress relaxation rate after two minutes at 25° C. is a value in percentage obtained by dividing stress after two minutes by maximum stress and then subtracting the resulting value from 1.

3. The interlayer filling material for a touch panel according to claim 1, wherein the polyvinyl acetal is polyvinyl butyral.

4. The interlayer filling material for a touch panel according to claim 1, wherein the polyvinyl acetal has an average degree of polymerization of 2,000 or less.

5. The interlayer filling material for a touch panel according to claim 1, wherein the amount of the plasticizer relative to 100 parts by weight of the polyvinyl acetal is 10 to 75 parts by weight.

6. The interlayer filling material for a touch panel according to claim 1, further comprising:

a reactive diluent; and a photopolymerization initiator.

7. The interlayer filling material for a touch panel according to claim 6, wherein the reactive diluent is a (meth)acrylic reactive diluent, an epoxy reactive diluent, or a silicone reactive diluent.

8. The interlayer filling material for a touch panel according to claim 6, wherein the amount of the reactive diluent relative to 100 parts by weight of the polyvinyl acetal is 0.1 to 30 parts by weight.

9. A touch panel laminate comprising:

a touch panel; and the interlayer filling material for a touch panel according to claim 1, the interlayer filling material for a touch panel filling at least one interlayer space selected from the group consisting of an interlayer space between a surface protection panel and the touch panel, an interlayer space between the touch panel and a polarizing film, and interlayer spaces included in the touch panel between transparent conductive films, between a glass sheet and one of the transparent conductive films, between a glass sheet and another glass sheet, between a glass sheet and a polarizing film, between a substrate and a glass sheet, between a substrate and one of the transparent conductive films, and between a substrate and a polarizing film.

* * * * *